United States Patent [19]

Fausone et al.

[11] Patent Number: 4,716,587

[45] Date of Patent: Dec. 29, 1987

[54] BROADBAND-SIGNAL BROADCASTING SYSTEM

[75] Inventors: Alfredo Fausone, Ivrea; Agostino Moncalvo, Turin, both of Italy

[73] Assignee: CSELT - Centro Studi e Laboratori Telecomunicazioni S.p.A., Turin, Italy

[21] Appl. No.: 861,074

[22] Filed: May 8, 1986

[30] Foreign Application Priority Data

Jun. 3, 1985 [IT] Italy ................ 67509 A/85

[51] Int. Cl.$^4$ ............................................. H04N 7/167
[52] U.S. Cl. ........................................ 380/10; 380/13; 380/19; 380/34
[58] Field of Search ............... 358/114, 117, 121, 123; 455/27, 28; 380/10, 13, 19, 34

[56] References Cited

U.S. PATENT DOCUMENTS

| | | | |
|---|---|---|---|
| 2,952,735 | 9/1960 | Weiss | 358/121 |
| 3,789,131 | 1/1974 | Harney | 380/13 |
| 3,914,534 | 10/1975 | Forbes | 358/123 |
| 3,975,585 | 8/1976 | Kirk et al. | 358/117 |
| 4,322,745 | 3/1982 | Saeki et al. | 358/114 |
| 4,464,678 | 8/1984 | Schiff | 358/123 |
| 4,611,242 | 9/1986 | Williams | 358/123 |

*Primary Examiner*—Stephen C. Buczinski
*Attorney, Agent, or Firm*—Karl F. Ross; Herbert Dubno

[57] ABSTRACT

A broadband signal broadcasting system comprising a circuit to encode video and audio signals forming a TV channel to be sent to a switching matrix, which is remotely operated by the subscriber; a circuit to multiplex two or more TV channel to be simultaneously transmitted on the subscriber's line, which can be a coaxial cable, a radio link or an optical fiber; and a circuit to receive the signals transmitted on the line, to separate two or more TV channels and to carry out channel decoding by supplying the subscriber's terminals with the corresponding video and audio signals. The system requires a single encoding and a single decoding of the nB→(n+m)B type on broadband signals, respectively at the output from signal sources and at the input of subscriber's terminals.

3 Claims, 3 Drawing Figures

# BROADBAND-SIGNAL BROADCASTING SYSTEM

FIELD OF THE INVENTION

The present invention relates to a telecommunications system between TV service centers and subscribers, connected through a communication network and switching exchanges and, more particularly, to a broadband-signal broadcasting system. Broadband signals of the type with which the invention is concerned are usually TV signals supplied by different producers (such as national or private corporations), by libraries, etc.

BACKGROUND OF THE INVENTION

From production centers such broadband signals arrive at a TV service centre, from which they are sent to a broadband exchange, after their conversion into a form suitable for switching and transmission. The transmission is carried out by a suitable system utilizing optical cables, coaxial cables or radio links, in order to reach the subscriber; the subscribers are, of course, equipped with decoders able to reconstruct the original TV signal.

Beside the transmission system between the broadband exchange and the subscriber's house, transmission systems exist between the service centers and the switching exchange, at the exchange and at the subscriber's location.

A problem to be solved when implementing a broadband broadcasting system, using already available apparatus which operates according to interface specifications recommended by CCITT, is the large number of interfacing circuits, generally different from one another, necessary to effect the numerous transmission code conversions the broadband signals have to undergo, according to their hierarchical levels.

In particular, conversions are required at the service centers output, at the input and output both of the broadband exchange and of long-and-short distance transmission systems, and at the subscriber's location.

Such a problem is described in the paper entitled "Architectural and technology aspects of broadband switching", presented by H. Bauch and others at ISS '84 Conference, held in Florence, 7–11 May 1984, and issued in the proceedings at session 23 C, Paper 1. More particularly, in the second paragraph of the second column on page 2, the necessity is mentioned of generating a limited redundancy code as close as possible to the source, where the transmission rate is lower.

SUMMARY OF THE INVENTION

These problems are solved by the broadcasting system provided by the present invention, in which a channel encoder is placed at the ouput from each broadband signal source.

The subsequent processing of these broadband signals, such as multiplexing and corresponding demultiplexing, is effected without any effect on the chosen encoding law at the source level. Thus a number of encoders equal to that of broadband signal sources is used, instead of a number equal to that of the subscriber terminals.

The present invention provides a broadband-signal broadcasting system wherein TV and audio signals, coming from different production centers and libraries are suitably processed and sent to a switching matrix; hence TV channels thus selected by the subscribers are multiplexed and transmitted on the line and during reception are reconverted into original TV and audio signals. The system comprises a circuit for the channel encoding of broadband signals consisting of:

- a first serial-to-parallel converter with one input and "i" outputs, controlled during loading by a first clock signal with a frequency equal to the digit frequency of the video signal and during reading by a second clock signal obtained from the first by a division by "i" effected by a first divider; where i is a first integer
- a first scrambler to avoid repetition of long sequences of constant data, which operates on "i" flows in parallel supplied by the first serial-to-parallel converter;
- a number "i" of serial-to-parallel converters with one input and "k" outputs, controlled during the loading by the second clock signal and during the reading by a third clock signal derived from the second signal by a division by "k" effected by a second divider, k being a second integer;
- a second scrambler, which operates on the audio signal flow;
- a FIFO memory, wherein audio data are written at the clock signal frequency for audio data and read at the frequency of said third clock signal;
- an encoding circuit, to effect the channel encoding of TV and audio data, supplied by said "i" serial-to-parallel converters and by FIFO memory, according to an i.k.B→(i.k+p)B code, where B means binary and p is the number of added bits (parity check, code violation, etc);
- a register to memorize the data supplied by the encoding circuit and to present them at the output, upon command of the third clock signal;
- a multiplexer to combine into a single parallel flow, consisting of (i.k+p) serial flows, both the flows supplied by registers of two or more circuits of the claimed type and a frame-alignment word;
- a parallel-to-serial converter, equipped with (i.k+p) input wires and one output wire whereupon a digital TV signal is available under serial form with channel encoding to be sent to said switching matrix.

A circuit for multiplexing one or more TV channels to be transmitted, as well as circuits for demultiplexing and decoding the received signals are also provided by the invention.

BRIEF DESCRIPTION OF THE DRAWING

The foregoing and other characteristics of the present invention will be made clearer by the following description of a preferred embodiment thereof, given by way of example and not in a limiting sense, and by the annexed drawing, in which.

SPECIFIC DESCRIPTION

In the embodiment herewith described reference will be made to encoding and transmission devices for broadband broadcasting.

More particularly, the described devices supply, upon subscriber demand one or two TV encoded channels at a bit frequency near 70 Mbit/s.

Figure 1:
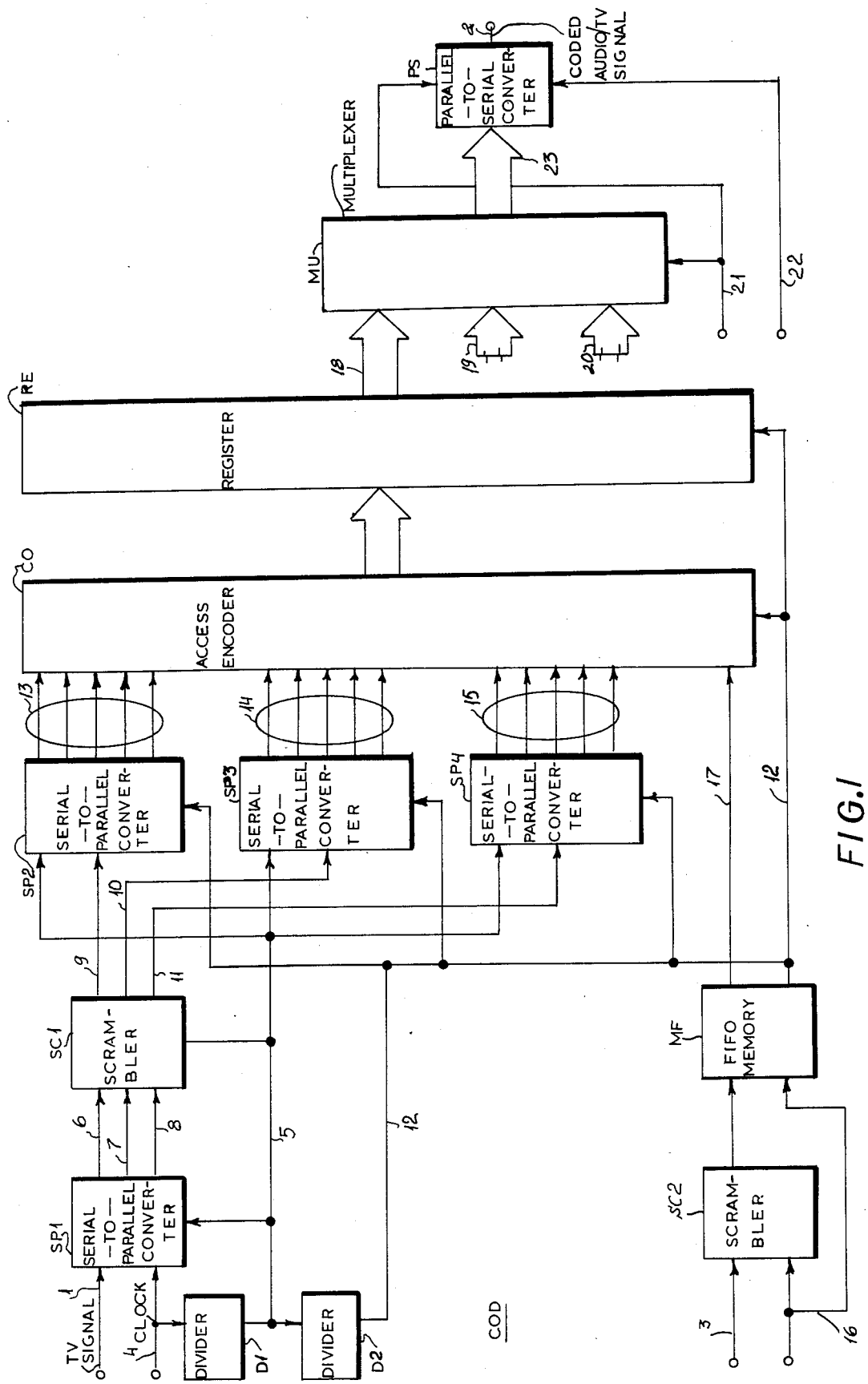
FIG. 1 is a block diagram of the channel encoding circuit denoted by COD.

The block diagram of FIG. 1 concerns a channel-encoding circuit for TV signals, received at the input on wire 1. Such a circuit, denoted by COD, can supply at the output on wire 2 a TV signal together with the relative audio coded under digital form in a serial flow, at the above bit frequency of about 70 Mbit/s. Video and audio signals access from the outside wires 1 and 3, with serial data flows at bit frequencies of 31,680 Kbit/s and 2,048 Kbit/s, respectively. The two flows are not necessarily synchronous, since they can be synchronized afterwards by the present circuit.

The clock signal of the video signal is present on wire 4, with frequency equal to 31,680 KHz, which is divided by three by a divider D1, thus obtaining on wire 5 a clock signal at a frequency of 10,560 KHz. The latter signal is used to control a serial-to-parallel converter SP1, so as to obtain at the outputs 6,7 and 8 a parallel data flow with a bit frequency reduced to a third. To avoid long sequencies at constant data values, converter SP1 is followed by a scrambler, denoted by SC1.

Its presence may also be unnecessary if the code adopted afterwards is such as to ensure a low d.c. level.

The three wires 9,10 and 11 at the output from SC arrive at three serial-to-parallel converters SP2, SP3 and SP4, controlled through wire 12 by the clock signal supplied by a divider D2.

D2 receives at the input and divides by five the signal on wire 5, supplying at the output on wire 12 a clock signal at the frequency of 2,112 KHz.

At each converter output a parallel flow is then present, consisting of five data flows with bit frequency reduced to a fifth. This allows the use of technologies particularly advantageous in the fabrication of an integrated circuit realizing the described circuit: e.g. CMOS standard-cell technology.

Even the data flow corresponding to audio signal, present on wire 3, is sent together with the clock signal at the frequency of 2,048 kHz, present on wire 16, to a scrambler SC2, in order to avoid long constant sequencies.

The serial flow at the output from SC2 is synchronized with the video data flows supplied by SP2, SP3 and SP4 trough a FIFO memory, denoted by MF. MF receives the data at the frequency of signal on wire 16, i.e. at the frequency of 2,048 kHz, and supplies them on wire 17 at the frequency of the signal present on wire 12, at 2,112 kHz.

The 16 flows present at the outputs of SP2, SP3, SP4 and MF access encoder CO, which operates in parallel on each at the frequency of 2,112 kHz, adding a possible parity bit and a possible bit signalling the inversion of the transmitted word, when the code requires it, in order to keep the d.c. component constant and limit the contents at low frequencies.

The word thus encoded, consisting of 17 or 18 bits, is stored in a register RE, controlled by the signal on wire 12, and appears at the output on connection 18.

A structure equal to the preceding one is connected to connection 19 in order to generate a TV signal at 70 Mbit/s and two audio channels at 2,048 Kbit/s, thus obtaining the corresponding data encoded on connection 23.

With the addition of a frame synchronism word on connection 20, three data flows are obtained which are multiplexed in a multiplexer MU controlled by a clock signal on wire 21 at a frequency slightly higher than twice that present on wire 12.

The parallel flow at the output from MU accesses through connection 23 a parallel-to-serial converter PS, controlled by a clock signal on wire 22 at a frequency of about 70 MHz. On wire 2 then a serial flow is obtained at a bit frequency near 70 Mbit/s, which can be sent to the broadband exchange.

CO operates on input flows by means of a code of $nB \rightarrow (n+m)B$ type, where m is a small number with respect to n so as not to increase too much the serial-flow bit frequency.

This code is valid for coaxial-cable, optical-fibre- and radio-links and permits the check of the connection performance by detecting the overcoming of the value predicted for the digital sum, due to transmission errors.

Moreover, as it consists of a block structure, an easy multiplexing can be carried out both at word and single-bit level.

Figure 2:
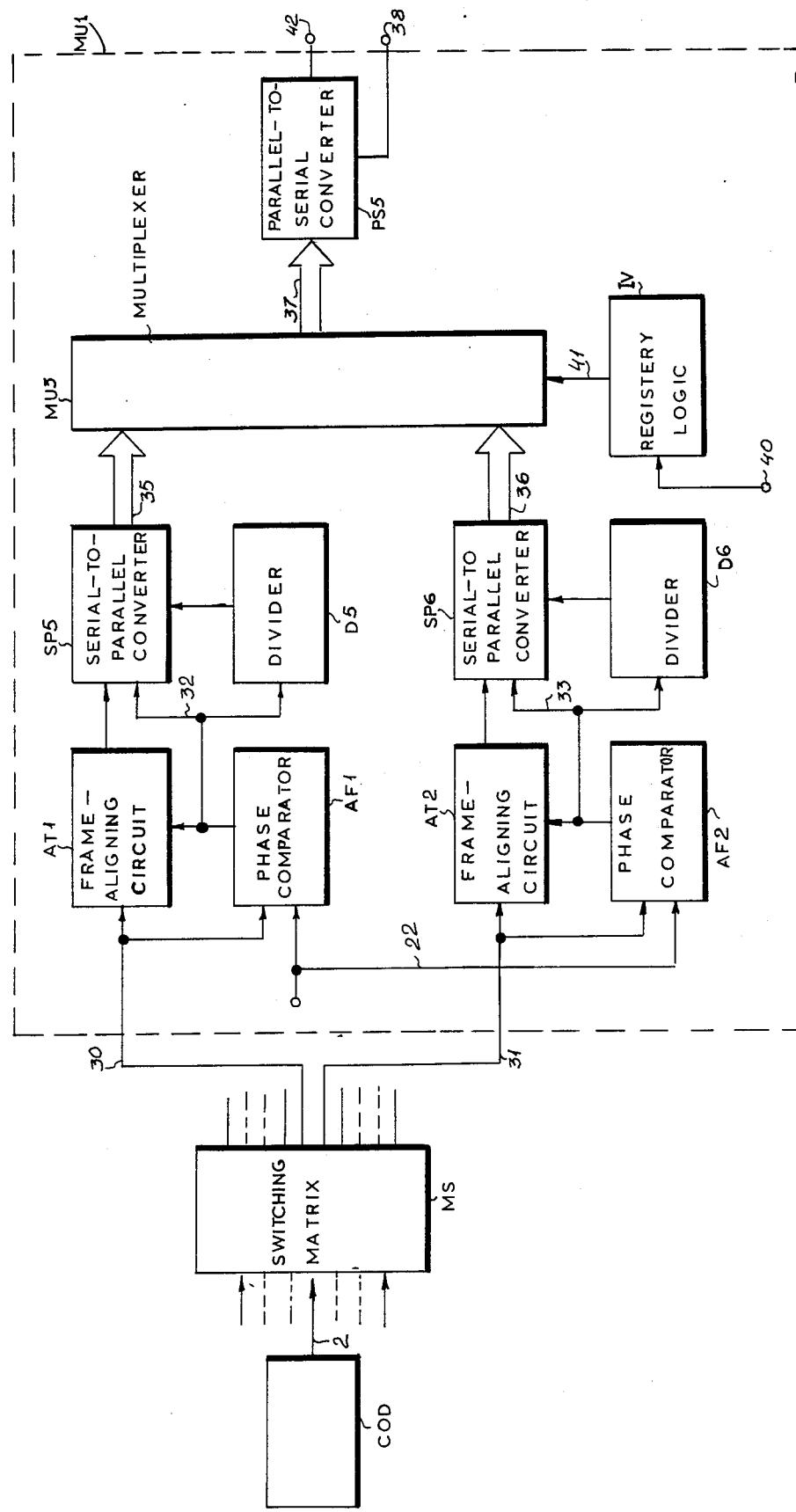
FIG. 2 is a block diagram of the circuit for the multiplexing of two TV channels, denoted by MU1.

With reference to FIG. 2, COD denotes the circuit of FIG. 1, which is connected by wire 2 to a switching matrix of the space type MS.

Ms is equipped with a certain number of inputs, corresponding to an equal number of signals produced by circuits of the COD type, and with a certain number of outputs, directed towards the subscribers. Generally the number of outputs is considerably higher than the number of inputs.

In function of the services offered to the subscribers, two or more matrix outputs, corresponding to an equal number of TV channels, are supplied to circuit MU1, so as to obtain the data flow to be transmitted on the subscriber's connection.

Circuit MU1 shown in FIG. 2 receives at inputs 30 and 31 two flows selected through MS and encoded by circuits similar to COD.

Each flow comprises a TV channel and two audio channels.

They access two possible frame aligning circuits AT1 and AT2, which supply at their outputs two flows with phased frame-aligning words. This allows an overall serial flow to be obtained by a simple multuplexing operation, whose low frequency characteristics are similar to those of the single encoded channel.

The correct reading of data on wires 30 and 31 by circuits AT1 and AT2 is obtained by re-phasing in blocks AF1 and AF2 the clock signal arriving on wire 22 from the homonymous wire of the preceding Figure.

Blocks AT1 and AT2 consist of a shift register and a simple logic suited to the detection of the frame-alignment word.

Blocks AF1 and AF2 consist of a phase comparator, which, on the basis of the difference between the phase of the signal on wire 22 and the phase of the data flow on wire 30 or 31, duly controls a delay line operating on the clock signal.

Hence the data are reconverted into parallel form by two serial-to-parallel converters SP5 and SP6.

They supply at the outputs as many signals as the signals at the outputs 18 and 19 in FIG. 1.

As shown in FIG. 2, data at the outputs of AT1 and AT2 are serially loaded into SP5 and SP6 at the frequency of the clock signal present on wire 32 or 33, at the output from AF1 or AF2. Two frequency dividers, denoted by D5 and D6, divide the clock signals and supply them to converters SP5 and SP6 for timing output data, on connections 35 and 36.

The flows in parallel form, present on connections 35 and 36, are multiplexed by a multiplexer MU3 and supplied at the output on connection 37. This connection, through a subsequent parallel-to-serial conversion carried out by a converter PS5, supplies on wire 42 the data flow to be transmitted to the subscriber. The converter is controlled by the clock signal present on connection 38, which has a frequency dependent on the line system. To identify the channel sequence along the frame and/or to implement a service channel, the alignment word can be modified by combinatory logic operations.

The first channel can e.g., by identified as formed by the first bit following the modified frame alignment word and the subsequent bits in odd position, while the other channel is obviously formed by the remaining bits.

The modifying operation is carried out by the block denoted by IV, comprising a register to store the frame alignment word and a simple combinatory logic which receives the word and returns it duly modified, e.g. complemented, on connection 41.

The command for modifying the frame alignment word can be periodic and automatic, in case of channel identification, or upon low-rate command sent over wire 40, in case a service channel for remote control functions is desired.

Encoded data, present on wire 42 at the output of converter PS5, access a possible scrambler and, hence, through a suitable driving circuit for copper-, or optical-cable- or radio-links, are transmitted to the subscriber.

According to the present example an on-line transmission rate of about 150 Mbit/s can be used.

At the subscriber's location, i.e. at the connection end, there is a suitable electrical or optical receiver, to supply the data flow at channel rate, with the corresponding synchronism signals. Said signals are extracted with a known method from the digital flow, which can afterwards be descrambled, once the inverse operation has been carried out during transmission.

Figure 3:
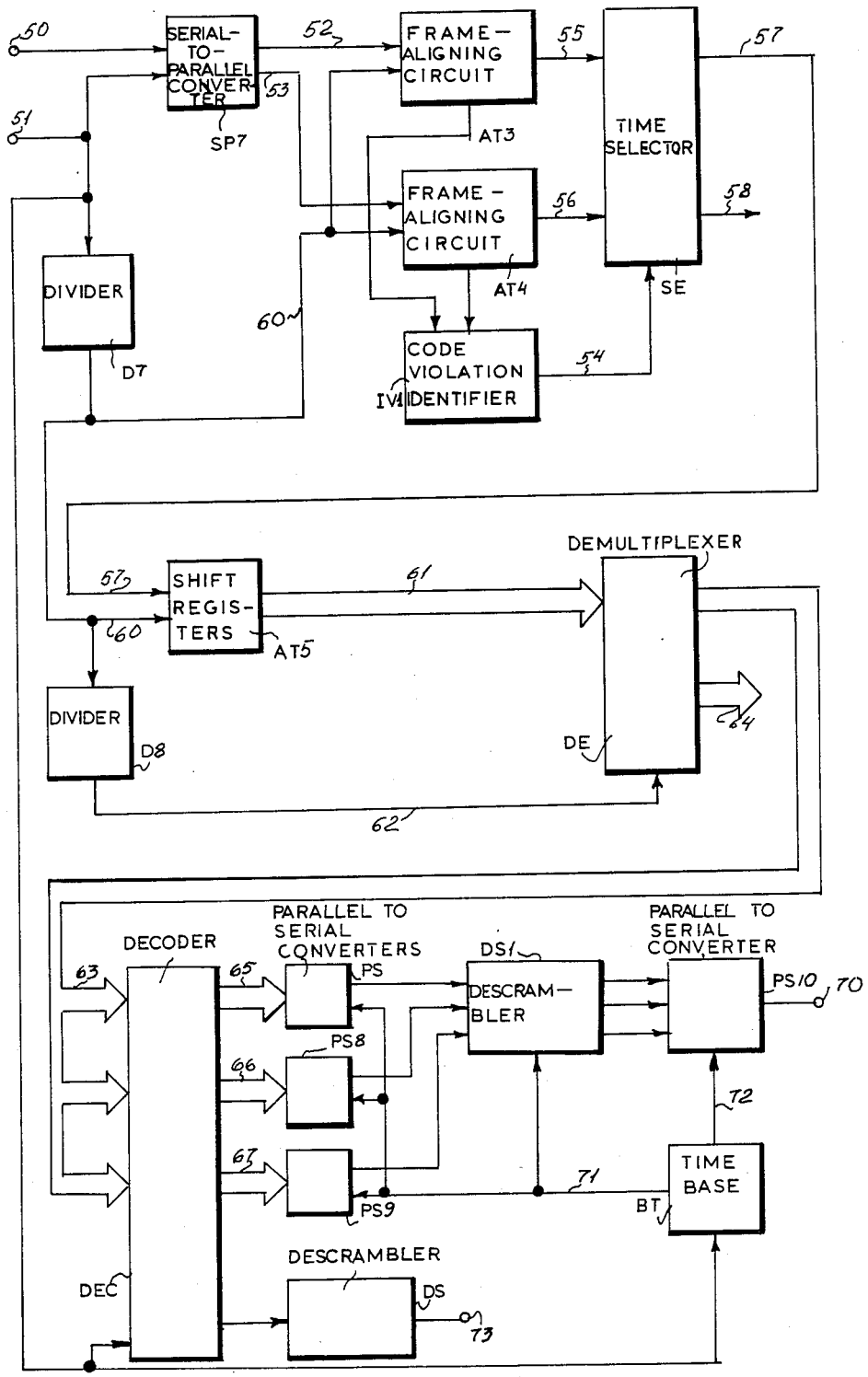
FIG. 3 is a block diagram of the demultiplexing and decoding circuit.

The block diagram of the circuit to decode the received data flow is shown in FIG. 3.

Data and synchronism access wires 50 and 51, which are connected to a serial-to-parallel converter SP7, with two outputs connected to wires 52 and 53. The binary flows thus obtained are sent to two frame aligning circuits AT3 and AT4, which detect the frame alignment word by the comparison with a pre-determined binary configuration. They operate at a clock frequency equal to half the frequency received on wire 51 and supplied on wire 60 by divide-by-two circuit D7.

A circuit IV1 to identify a code violation, consisting e.g. of the complementation of the frame alignment word, controls through wire 54 a time selector SE. This selector receives at the inputs 55 and 56 the flows supplied by frame-aligning circuits and returns the two transmitted channels to outputs 57 and 58.

Circuit IU1 prevents any ambiguity on the channel present on wire 57 or 58, since the first channel next to the complemented alignment word is certainly the first selected channel. This ambiguity would by unavoidable and ought to be resolved otherwise, in case of absence of identification information in the frame.

The two TV channels present on wires 57 and 58 are then sent to two identical circuits, of which only the one connected to wire 57 is shown.

The clock-frequency signal, used in frame aligning operation and present on wire 60, controls the correct loading of the serial data flow arriving from selector SE into a shift-register contained in block AT5. This register presents a number of cells equal to the number of bits used by transmission encoder (COD of FIG. 1), e.g. 17 or 18.

The register data are then transferred in parallel to another shift-register, still contained in AT5. This transfer is controlled by a clock signal which depends on the occurred identification of the frame-aligning word according to known methods.

The original parallel data flow is then present on connection 61 at the input of demultiplexer DE, which is to separate the two parallel flows forming the original flow.

The clock signal, by which DE operates, is supplied by divider D8, which divides the clock signal present on connection 60 by the number of bits in parallel used by the encoder, obtaining a frequency of about 35 MHz.

At the output, on connections 63 and 64, there are the flows composed of 17 or 18 parallel signals, which go to two equal parts of the circuit, only the one connected to connection 63 being shown.

The next block, i.e. decoder DEC, effects the channel decoding, checks the adopted encoding law, so as to allow an error rate measurement, and besides separates the bits associated with the video signal from those associated to the audio signal.

Parallel bits of the video channel, subdivided into 3 groups, are present at the output on connections 65, 66, 67 and bits of audio channel on wire 68.

Through a parallel-to-serial conversion carried out by three converters PS7, PS8, PS9, a parallel descrambling carried out by DS1 and a final parallel-to-serial conversion carried out by converter PS10, the three flows supply the video signal on wire 70.

A time-base circuit BT, locked to the input frequency present on wire 51, supplies timings for the parallel-to-serial and descrambling operations.

Namely, on wire 71 there is a signal at a frequency of 10,560 kHz and on wire 72 a signal at a frequency of 31,680 kHz.

Through a suitable descrambler DS2 also audio signals are available on wire 73.

It is clear that what described has been given only by way of non-limiting example. Variations and modifications are possible without going out of the scope of the present invention.

For example, the words supplied by the transmission encoder can consist of a different number of bits. Timing signal frequencies can be different as different can also be the dividing moduli of dividing circuits and the ratios between the numbers of incoming and outgoing wires at the serial-to-parallel and parallel-to-serial converters.

We claim:

1. A broadband broadcasting system having video signals and audio signals originating from various sources, said video signals and said audio signals being processed by said broadcasting system, each of said audio signals having an audio frequency and each of said video signals having a video frequency, said video signals and said audio signals being decoded by subscribers connected in said system by a decoding circuit, said broadcasting system comprising:
   a first serial-to-parallel converter having a first input and forming at least one output;
   a first clock coupled to said first serial-to-parallel converter forming a first clock signal with a first clock frequency equal to said video frequency, wherein said first clock signal controls loading of said first serial-to-parallel converter at said first input with said video signal;

a first frequency divider coupled to said first clock and said first serial-to-parallel converter, for dividing said first clock signal forming a second clock signal for controlling reading of said serial-to-parallel converter;

a first scrambler coupled to said output of first serial-to-parallel converter;

a second frequency divider coupled to said first frequency divider and forming a third clock signal;

a first converting means comprising at least one serial-to-parallel converter for each output of said first serial-to-parallel converter, coupled to said first frequency divider, said first scrambler and said second frequency divider, wherein said third clock signal controls reading of said converting means;

a second scrambler receiving said audio signals;

a first memory coupled to said second scrambler, wherein said audio frequency controls loading of said first memory and said third clock signal controls reading of said first memory;

an encoding means coupled to said first memory and said converting means for channel encoding said video and said audio signals;

a register coupled to said encoding means, said first memory and said third clock signal for storing an output of said encoding means;

a multiplexer coupled to said register for combining said output of said register into parallel flow and a frame alignment word;

a parallel-to-serial converter coupled to said multiplexer forming a digital TV signal, under serial form with channel encoding; and a switching matrix coupled to said parallel-to-serial converter for selection of television channels by said subscribers.

2. A broadcasting system as defined in claim 1 for handling at least two digital TV signals in serial form wherein said switching matrix comprises:

two rephasing circuits comprised of a delay line operating on a fourth clock signal, said fourth clock signal controlling said parallel-to-serial converter, and said two rephasing circuits being controlled by a phase comparator, said phase comparator comparing phase of said fourth clock signal with phase of said TV signals, each of said two rephasing circuits generating a fifth clock signal;

a third frequency divider and fourth frequency divider for dividing said fifth clock signal forming a sixth signal and an seventh clock signal;

a first logic means;

two frame-aligning circuits coupled to said two rephasing circuits and said switching matrix, each of said two frame-aligning circuits comprised of shift-registers to load and read said TV signals, each of said two frame-aligning circuits being controlled by said first logic means for detecting said frame alignment word;

third and fourth serial-to-parallel converters each coupled to one of said two frame-aligning circuits, said third and said fourth serial-to-parallel converters being controlled during loading by said fifth clock signal and controlled during reading by said sixth and seventh clock signals;

a second multiplexer coupled to said third and fourth serial-to-parallel converters;

a second parallel-to-serial converter coupled to said second multiplexer to convert output of said multiplexer into a single serial flow; and a second logic means coupled to said second multiplexer for transmitting said second multiplexer said frame-alignment word.

3. A broadcast system as defined in claim 2 wherein said decoding circuit comprises:

a fifth serial-to-parallel converter for receiving said serial flow;

an aligning circuit coupled to said fifth serial-to-parallel converter for comparing said serial flow with predetermined binary configurations;

a fifth frequency divider coupled to said aligning circuit forming an eighth clock signal;

a code violation detector coupled to said aligning circuit for detecting code violations;

a time selector coupled to said code violation detector for outputting each of a plurality of television channels;

a third frame aligning circuit coupled to said time selector;

a sixth frequency divider coupled to said fifth frequency divider forming said ninth clock signal;

a demultiplexer coupled to said third frame aligning circuit for separating an output of said third aligning circuit controlled by said ninth clock signal;

a decoder coupled to said demultiplexer for obtaining an audio serial flow and a parallel video flow;

a second converting means comprising at least one serial-to-parallel converter coupled to said demultiplexer for converting said parallel video flow into a serial video flow;

a first descrambler coupled to said second converting means for descrambling said serial video flow; and a second descrambler coupled to said demultiplexer for descrambling said serial audio flow.

* * * * *